Aug. 5, 1941.  A. J. MIEHLE  2,251,615
AUTOMOBILE BRAKE INDICATOR
Filed April 2, 1938  2 Sheets-Sheet 1
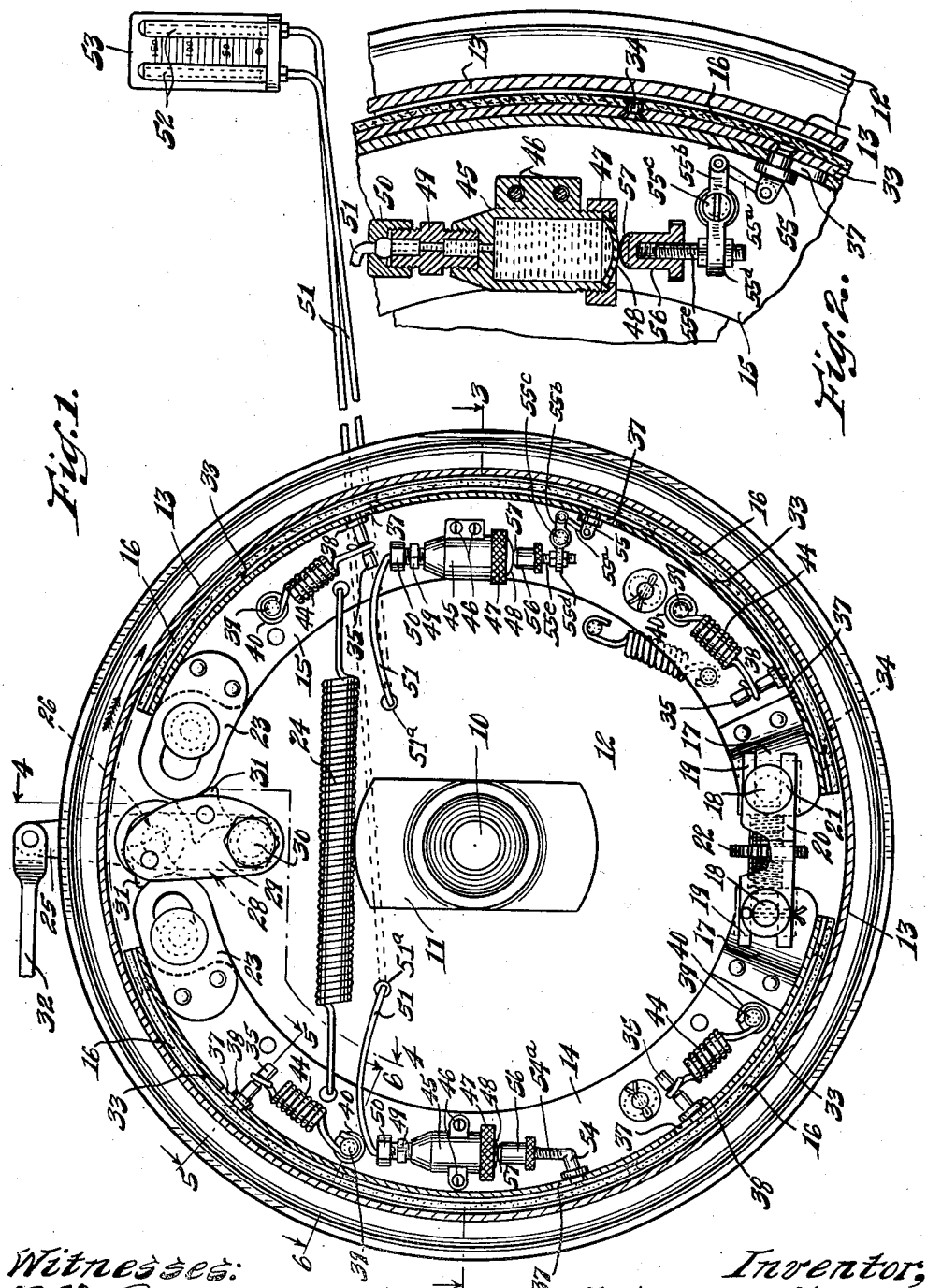
Witnesses:
E. E. Wessels
Aasta E. Nelsen
Inventor:
Arthur J. Miehle,
By Joshua R. H. Potts
his Attorney.

Aug. 5, 1941.  A. J. MIEHLE  2,251,615
AUTOMOBILE BRAKE INDICATOR
Filed April 2, 1938  2 Sheets-Sheet 2
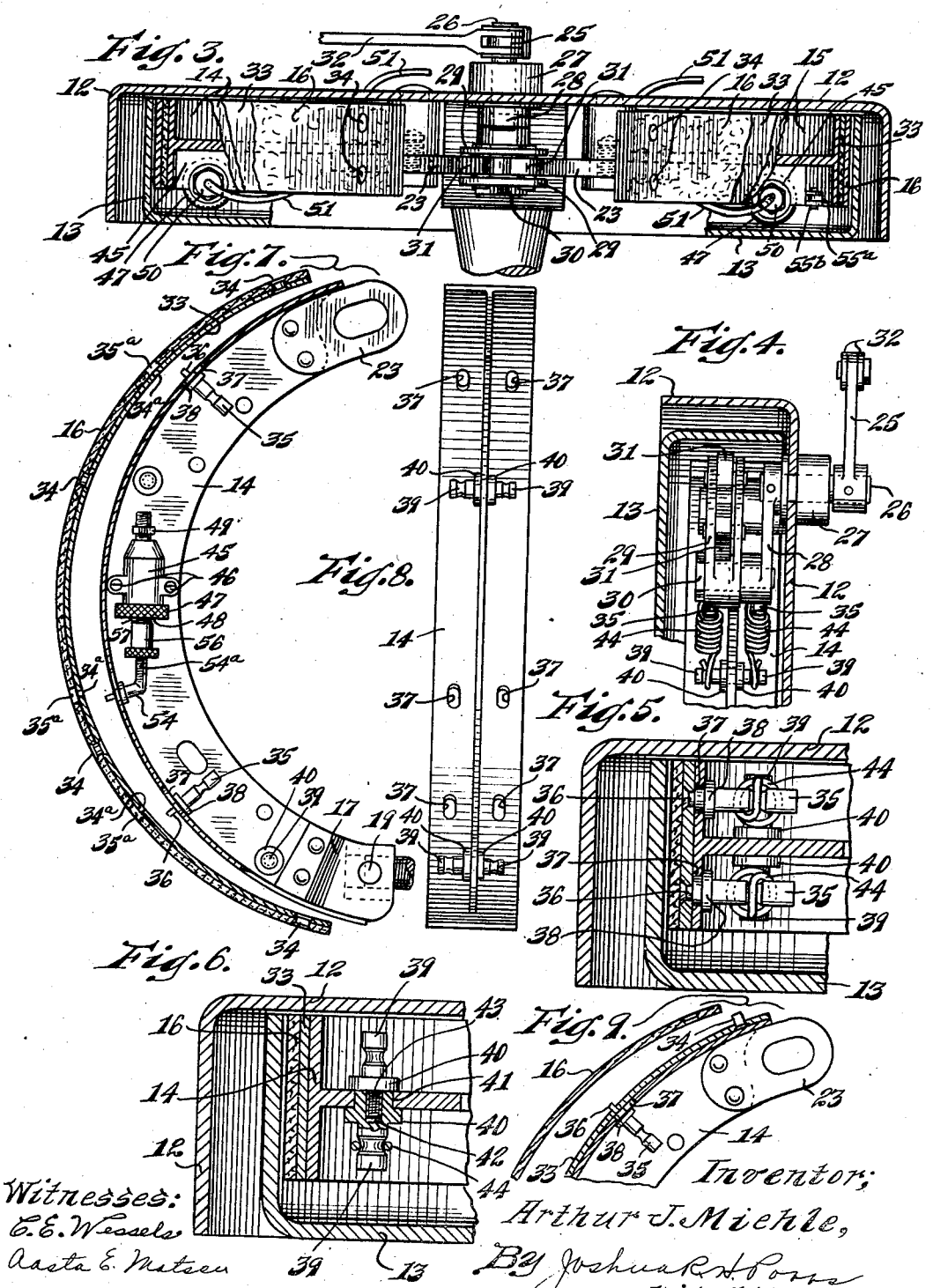

Patented Aug. 5, 1941

2,251,615

UNITED STATES PATENT OFFICE 2,251,615

AUTOMOBILE BRAKE INDICATOR

Arthur J. Miehle, Bensenville, Ill.

Application April 2, 1938, Serial No. 199,595

8 Claims. (Cl. 265—24)

This invention relates to brake mechanism for automobiles, and more particularly to a novel device to indicate or register as by a liquid level gauge in front of the driver of an automobile the exact pressure or effort applied or exerted on the brake of each wheel when checking the momentum of, or bringing the automobile to a stop, whereby the driver will be advised at all times if the brakes are functioning properly and warned of defective operation so that the condition can be immediately corrected or the braking action equalized with respect to opposite wheels according to best practice in the art, and possible accidents resulting from defective brakes avoided.

The invention further relates to a novel device for testing the amount of effort or pressure applied against the brake drums and particularly to each individual brake shoe and to indicate to the driver of an automobile as by a signal, a gauge of the liquid level or other type on the dash in clear view of the driver, how the brakes are operating, that is for instance, the pressure or friction in pounds applied by or between the brake shoes and linings against the brake drums, thus providing an efficient and practical testing device to determine the condition of the brakes and serving to warn the driver so that the brakes may be tightened or adjusted when needed and consequently maintained in proper or perfect and effective working condition at all times so that the momentum of the car may be effectively checked, thereby eliminating accidents and thus injury, death and destruction which might otherwise result, and reducing the toll so prevalent.

A further object of the invention is to provide a device to register the friction or amount of effort applied against a brake drum to stop a car, which is applied directly to the braking mechanism with but simple modification of the brake structure, which is simple and effective and positive in operation.

Other objects and advantages will appear and be brought out more clearly in the attached drawings, wherein:

Fig. 1 is a sectional elevation looking at the outside of the mechanism with the invention applied thereto;

Fig. 2 is an enlarged fragmentary sectional view of the hydraulic pressure exerting means;

Fig. 3 is a diametrical horizontal sectional view partly in elevation taken on the section line 3—3 of Fig. 1;

Fig. 4 is a sectional view taken on the section line 4—4 of Fig. 1;

Fig. 5 is a sectional view taken on the section line 5—5 of Fig. 1;

Fig. 6 is a sectional view taken on the line 6—6 of Fig. 1;

Fig. 7 is a detached elevation of a brake shoe and parts carried thereby with the lining and lining carrier in disassembled relation to show the manner of assembling the same;

Fig. 8 is an inside elevation thereof; with certain parts omitted; and

Fig. 9 is a fragmentary view similar to Fig. 7, but showing another assembling method.

Referring more particularly to the drawings, I show the indicator and mechanism applied to a front wheel, and wish to have it understood that this is merely for purposes of illustration and that the device is equally capable of application to the braking mechanism of the rear wheels. As shown, 10 indicates the spindle of the front axle having the usual steering knuckle 11, and 12 is the usual flanged plate or axle housing held stationary to the axle. 13 is the brake drum carried by and adapted to rotate with the wheel (not shown) in the usual way and disposed within the peripheral rim or annular flange of the housing 12. Within the drum 13 but carried by the housing 12 are brake shoes 14 and 15, shown of standard smooth faced type of substantially uniform thickness which act outwardly against the inner face of the peripheral rim or annular flange of the drum through the medium of the brake linings 16 to check the momentum of the car as is customary in brakes of the internal expanding type for service use, although I do not desire to be limited to this type.

The brake shoes 14 and 15 are each fulcrumed at one end, the lower ends being so mounted in the form illustrated. For this purpose, said lower ends are provided with laterally offset portions 17 which may be formed with or attached to the web of the shoes and are apertured to form ears having bearings on the anchors or pins 18 in the manner of trunnions fitted in the forks or slotted ends 19 of bearing or anchor plates 20 between the ends of the shoes and overlapping the ears thereof.

The anchors or trunnions 18 may have heads or rollers 21 on the ends thereof outwardly of the plates 20 as is common in some types of brakes and carried by these plates or brackets formed thereby is a turn buckle structure 22 in the form of a bolt having oppositely threaded ends engaging the anchors or trunnions 18 and having a knurled nut in the center. By this means, the shoes are pivotally supported to swing inwardly and outwardly and the spacing of the ends of the shoes may be regulated or adjusted so that the shoes will properly engage the brake drum and give the most desirable and effective braking action.

However, I wish it to be understood that I do not desire to be limited to the exact mounting construction shown. As will be particularly seen in Fig. 3 of the drawings, the shoes are held against rotation by being anchored to the housing 12 or simply mounted loosely within the drum and pivotally attached to the housing at any other suitable point.

The opposite or upper ends of the shoes are provided with projecting slotted ears 23 which may also be formed as parts of the webs of the shoes or attached thereto and thus offset laterally from the planes of the webs as distinguished from the peripheral portions of the shoes which carry the linings for action against the drum.

As seen in Figs. 1, 3, and 4, suitable means is provided to expand the brake shoes against the action of a retractile spring 24 connected to the opposed shoes and normally contracting or drawing the same toward each other so as to release the linings from the drum. This means may be mechanically or otherwise operated and is shown of the mechanical type having an arm 25 pivoted at 26 through the inside or radial wall of the housing 12 in a suitable bearing 27 mounted in said wall, or in the form of a boss and having an arm 28 within the housing and extending laterally in a diametrically opposite direction with respect to the arm 25. A fork 29 is pivotally carried by the free end of the arm 28 as shown at 30 and is provided with star wheels or cams 31 pivoted or journaled therein at spaced points to coact with the extremities of the shoes by operating the brake pull rod 32 in order to expand or permit retraction of the brake shoes.

I do not wish to be limited to this exact operating structure as other means may be provided whether operated by a mechanical or hydraulic device, liquid or air.

Associated with the peripheral or gripping portions of each shoe is a movable or sliding member shown as a lining carrier or auxiliary shoe 33 which bears directly on the peripheral portion of the shoe and is formed of metal, as well as with openings through which the linings 16 are riveted, as indicated at 34. The carrier or auxiliary shoe is provided with upper and lower pairs of inwardly extending shouldered studs or radial pins 35 which are also riveted thereto as indicated at 36 and operate in circumferentially elongated holes or slots 37 in the peripheral portions of the brake shoes 14 and 15 for a limited circumferential or sliding translatory movement with respect to the peripheral portions of the shoes 14 and 15. These pins have flanges 38 at the inner faces of the shoes to prevent outward displacement of the carrier relative to the shoe 14 and keep the latter relatively snug with respect to the shoe.

Incidentally the pins are disposed on opposite sides of the web of the shoe. Other studs or pins 39 are fixed to or mounted through the web of the shoe, as shown more particularly in Fig. 6, and flanged at 40 against the opposite faces of the web to extend in opposite directions from the web of the shoe and one pin extends through an aperture in the web as at 41, which portion has a threaded socket 42 receiving a threaded stem 43 of the oppositely extending pin to detachably connect the two.

Between the pins 35 and 39 are tension springs 44 of the tractile type exerting a calibrated or known tensional force which may be measured in a suitable standard of measure such as pounds. These springs serve to exert tension on the pins 35 by reason of being fixed to the shoes through the medium of the pins 39 and thus normally hold the carriers 33 and the linings carried thereby in one direction at certain ends of the slots 37 that is, toward the pins 39 or the anchored or fulcrumed ends of the shoes at one side and toward the other ends at the other side, or opposite the direction of rotation of the wheel and brake drum.

In the assembly of the carriers on the shoes and the linings on the carriers and thus indirectly on the shoes, the carriers, as seen in Fig. 7 of the drawings, may have the linings 16 riveted thereto as at 34 through registering corresponding apertures therein, and this assembly also apertured as at 34a and 35a to fit over the ends 36 of pins 35 and said ends upset through the large openings 35a against the carriers 33 around the openings or apertures 34a to connect the lining carriers or sliding members 33 and linings carried thereby and fixed thereto, to pins 35 to move relative to the shoes 14 and 15 on the flange or rim thereof. However, as seen in Fig. 9, the carriers 33 as apertured may be fitted over the shank portions or ends 36 of the pins 35 with the rivets 34 in position in the apertures of the carriers and before the linings are applied to the latter. The portions 36 are then riveted or upset to slidably secure or mount the carriers on the shoes and then the linings applied at their apertures over and to the shanks of the rivets 34 after which the latter are upset against the linings. In either case, the linings and the carriers are secured in immovable relation to one another and the carriers and lining permitted to move bodily as a single element in a limited sliding, circumferential or translatory movement relative to the peripheral portions of the shoes during the application and releasing of the brakes permitted by the movements of the pins 35 in the elongated slots 37.

In order to register the braking pressure or force exerted in checking the momentum of the car at the brakes, that is, the friction between the brake linings and drum or amount of effort applied against the drum to stop the car, and thus indicate as well as test the condition of the brakes, I make use of this relative movement between the linings and the shoes proper, and for this purpose cylinders 45 are mounted on each shoe as indicated at 46 and each is provided with a knurled and internally threaded apertured cap or ring 47 retaining a flexible diaphragm 48 in position against the open end of the cylinder, said diaphragm being of chamois, leather, metal, or other suitable flexible and pliable material. The opposite end of the cylinder is connected by a coupling 49 preferably of the type having oppositely threaded ends and an intermediate wrench face in the form of a nipple and a coupling 50 with a hollow flexible conduit or tube 51 leading through a suitable opening 51a in the housing 12 and to a liquid level tube or column 52 of a calibrated gauge 53 which may be mounted on the dash or at other suitable place readily visible to the driver of the car so as to be seen at all times. This gauge is illustrated as graduated to indicate a suitable standard scale of pressure such as pounds per square inch or otherwise, and two of such columns are shown, one for each brake shoe of the brake mechanism of each wheel. Obviously, other indicating or registering means may be employed to indicate the friction, pressure or effective grip between the linings of the brake shoes and the drum.

Also associated with the carriers or auxiliary shoes 33 are actuating arms or pins 54 and 55 mounted on the lining carriers in the same manner as the pins 35. The pin 54 has a threaded shank or stem 54a extending axially with respect to the corresponding adjacent cylinder 45 toward and in close proximity to the diaphragm 48 thereof, while pin 55 has apertured ears as its inner end connected by a link 55a with the outer end of a rock lever 55b pivoted to shoe 15 at 55c and adjustably connected at its inner end 55d to a threaded shank or stem 55e extending axially of the adjacent cylinder 45. Abutment caps 56 in the form of hollow or cap nuts are threaded on the portions 54a and 55e with knurled flanges to permit adjustment so as to bring the ball portions 57 thereof in proper relation and in juxta-position to contact with the diaphragms 48, so that as the brakes are applied and the shoes function outwardly under the expansion action of the suitable means operated either mechanically or hydraulically, as described, the lagging of the shoes against the braking surface of the drum by the gripping action therebetween causes the slidable or movable members constituted by the carriers and linings to be moved slightly in a circumferential direction or translatory movement on the peripheral portions of the drums. This in turn causes the portions 57 to exert pressure against the normally outwardly expanded diaphragms 48 and the oil or other fluid within the cylinders and tubes or conduits 51 is forced under pressure within the columns 52 which are of transparent material so as to register in coaction with the graduations on the gauge to indicate the pressure or force exerted and thus the effort applied against the drum by the brakes to stop the car. In other words, the sliding member will act as a spring balance scale which, coacting with the gauge or indicator, measures the friction between the brake linings and drum or pounds of pressure applied against the drum by means of pulling the sliding member or carrier away or expanding the springs 44 in the manner of a spring scale so as to measure the amount of effort used against the drum. The device also serves as a testing device to test the amount of effort applied against the drum to stop the car and in this respect acts with each braking action so as to constantly advise and warn the driver of the conditions of the brakes of the car or automobile so that they may be kept in proper service condition for efficient braking action, thereby eliminating accidents which might otherwise result from the use of defective brakes.

It is understood that while I have illustrated mechanical means for operating brakes, hydraulic means may be employed and the gauge may also be mechanically operated in conjunction with the arrangement and structure described as well as operated hydraulically in the manner illustrated and as set forth herein, the principle being the same in each case. Furthermore, by having the connection between the lining carrier and the shoes located at different points and the pins carried by the slidable element or carrier, the brake pressure is equally distributed over the whole brake surface or sliding element. Thus, when measuring the amount of effort applied against the drum and the device is working, the action and relation of the parts at diametrically opposite sides of the drum or with respect to the opposite shoes is opposite and the pressure is applied equally on both shoes of the braking mechanism of each wheel. Thus, the brakes of opposite wheels may be equalized and maintained in proper operating condition by adjustment of the brakes in the usual way.

When pressure is applied on the brakes, the rotation of the wheel and friction of the brake linings on the drum will have a pulling effect on the sliding members or carrier and the calibrated tension springs 44 will pull against the effect of the springs normally holding the pins or studs at one limit of the slots and the linings and carriers in one position thus allowing only a required or slight degree of movement of the sliding members to operate the pressure indicating device as by action against the diaphragms to make an indication on the liquid level or other indicating device used to record the movement of the sliding member and thus the brake pressure of each wheel brake through the medium of the actuating arms to work the diaphragms on the liquid level to cause a reading on the gauge which is also calibrated in pounds tension. The reading on the level or gauge represents pounds tension as determined by the amount of friction the brake lining affords against the drum and the rotation of the wheel causing the sliding member to slide and expand or pull the springs apart or a so-called "stretch" and a corresponding amount of friction in pounds tension is required of the drum to pull said springs and stretch them to equal so much pounds tension as it is a known requirement that to stretch said springs to a definite length will require an equal amount of effort or pull. Thus, the braking pressure or friction will be accurately determined and recorded. Obviously, the device may be used in conjunction with any suitable recording or indicating device adapted for that purpose.

Having thus described my invention, what I claim as new and desire to secure by Letters Patent is:

1. In a braking mechanism, a drum, shoes normally contracted in said drum, means to expand the shoes against the drum, auxiliary shoes slidably mounted on and in frictional contact with the first shoes, means to limit the sliding movement, yieldable means for resisting the force tending to move the auxiliary shoes and means operated by such movement to indicate the braking effect.

2. In a brake mechanism for automobiles or the like, a housing, a drum adapted to rotate with a wheel of the automobile, shoes mounted in the housing and drum and held against rotation with the drum and normally held away from the drum but mounted to move toward and away from the drum, means for effecting such movement toward the drum, supplemental shoes fitting the first shoes and mounted for limited movement thereon, linings on the supplemental shoes to directly engage the drum, calibrated means to hold the supplemental shoes at the limits of their movement in one direction, fluid containing chambers mounted on the shoes and each having a diaphragm, abutments operated by the supplemental shoes to engage the diaphragms, and a gauge having conduits communicating with the chambers having conduits to register the pressure of the fluid in the chambers and thus the friction or braking pressure between the shoes and drum.

3. In a brake of the class described, a drum, a shoe coacting therewith, a member movable on the shoe, a lining fixed on the movable member, means to yieldably hold the movable member in one position at one limit opposite the direction of rotation of the drum when the brake is inoperative while permitting movement thereof to another position and means operated by said movement when the brake is applied to indicate the braking action.

4. In a braking mechanism, a drum, shoes normally contracted in said drum, means to expand the shoes against the drum, auxiliary shoes slidably mounted on and in frictional contact with the first shoes, means to limit the sliding movement, tension springs between the respective shoes holding the auxiliary shoes in one direction counter to the direction of rotation of the drum and to permit movement therewith in the opposite direction when the brakes are applied and the shoes are expanded against the drum, and means operated by such movement to indicate the braking effort including a gauge having means operatively connected to the shoes and auxiliary shoes and operated by the sliding movement of the auxiliary shoes to actuate the last named means.

5. In combination, a braking mechanism including a drum, a shoe, an auxiliary shoe movably mounted on the first shoe in frictional contact therewith and having limited translatory movement, means yieldably resisting relative movement of said shoes and means effective by said movement and calibrated to indicate the braking action between the shoes and the drum when the brake is applied.

6. In an auto brake indicator, a drum, a shoe, a brake lining carrier, a lining thereon, said carrier having limited circumferential movement on and against the shoe in frictional engagement therewith and the lining engaging the drum, yieldable means tending to hold the carrier in a direction opposite to the direction of rotation of the drum while permitting movement therewith, and pressure actuated means operatively connecting the shoe and carrier and operated by such movement in the application of the brake to indicate the friction between the brake lining and drum.

7. In a braking mechanism, a rotatable drum, pivoted shoes coacting with the drum, linings slidably secured on and against the shoes and having metallic mountings bearing directly on the shoes, calibrated means between the shoes and mountings to yieldably hold the mountings and linings at the limit of their movement in one direction opposite to their braking movement, and means coacting between the shoes and mountings and operated by movement of the linings relative to the shoes in applying the brake to indicate the effective friction between the linings and drum.

8. In a braking mechanism, a drum, a pivoted shoe having a rim of uniform thickness coacting therewith, a metallic strip of uniform thickness and of the same length as the rim connected against radial displacement to the shoe and for limited movement parallel to the shoe and in frictional contact therewith when the shoe is pressed against the drum, a lining on the strip to engage the drum, yieldable calibrated means normally holding the strip and lining in one direction and indicating means for indicating such movement or braking force.

ARTHUR J. MIEHLE.